(12) United States Patent
Tang

(10) Patent No.: US 11,463,376 B2
(45) Date of Patent: Oct. 4, 2022

(54) RESOURCE DISTRIBUTION METHOD AND APPARATUS IN INTERNET OF THINGS, DEVICE, AND STORAGE MEDIUM

(71) Applicant: GUANGDONG OPPO MOBILE TELECOMMUNICATIONS CORP., LTD., Guangdong (CN)

(72) Inventor: Hai Tang, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 17/342,270

(22) Filed: Jun. 8, 2021

(65) Prior Publication Data
US 2021/0297366 A1    Sep. 23, 2021

Related U.S. Application Data

(63) Continuation of application No. PCT/CN2019/124438, filed on Dec. 11, 2019.

(30) Foreign Application Priority Data

Dec. 11, 2018 (CN) .......................... 201811508318.5

(51) Int. Cl.
*H04L 47/70*    (2022.01)
*H04L 67/51*    (2022.01)

(52) U.S. Cl.
CPC .............. *H04L 47/82* (2013.01); *H04L 67/51* (2022.05)

(58) Field of Classification Search
CPC .............. H04L 63/102; H04L 67/1017; H04L 47/6275; H04L 67/1036; H04L 47/125;
(Continued)

(56) References Cited

U.S. PATENT DOCUMENTS

| 8,943,180 B1* | 1/2015 | Petit-Huguenin | ....... H04L 43/10 |
| | | | 709/223 |
| 9,037,532 B1* | 5/2015 | Pradhan | .................. G06F 16/27 |
| | | | 707/610 |

(Continued)

FOREIGN PATENT DOCUMENTS

| CN | 101212458 A | 7/2008 |
| CN | 103634411 A | 3/2014 |

(Continued)

OTHER PUBLICATIONS

International Search Report (ISR) dated Feb. 28, 2020 for Application No. PCT/CN2019/124438.
(Continued)

*Primary Examiner* — Tonia L Dollinger
*Assistant Examiner* — Linh T. Nguyen
(74) *Attorney, Agent, or Firm* — Ladas & Parry, LLP

(57) ABSTRACT

Embodiments of the present application provide a resource distribution method and apparatus in Internet of things, a device, and a storage medium. The method includes: discovering, by a serving device, servers with resource directories from a server cluster; and distributing, by the serving device, resource information to at least two servers of the servers with the resource directories. According to the embodiments of the present application, resource discovery may be improved in reliability.

8 Claims, 5 Drawing Sheets

(58) Field of Classification Search
CPC ... H04L 47/2458; H04L 51/26; G06F 16/245; G06F 40/205; G06F 11/1435; G06F 16/00; G06F 16/90335; H04W 4/70
See application file for complete search history.

(56) References Cited

U.S. PATENT DOCUMENTS

| | | | | |
|---|---|---|---|---|
| 2006/0120396 | A1 | 6/2006 | Hasegawa et al. | |
| 2012/0131117 | A1* | 5/2012 | Leshchiner | H03M 7/30 709/206 |
| 2014/0266684 | A1* | 9/2014 | Poder | G08B 25/001 |
| 2015/0264134 | A1* | 9/2015 | Dong | H04L 67/16 709/204 |
| 2017/0331893 | A1* | 11/2017 | Crofton | H04L 67/1095 |
| 2019/0014615 | A1* | 1/2019 | Wang | H04L 61/6059 |
| 2019/0260707 | A1* | 8/2019 | Kesavan | H04L 67/025 |
| 2019/0394654 | A1* | 12/2019 | Gardner | H04W 24/02 |
| 2021/0219117 | A1* | 7/2021 | Novo Diaz | G06F 16/9558 |

FOREIGN PATENT DOCUMENTS

| | | |
|---|---|---|
| CN | 104704794 A | 6/2015 |
| CN | 105210126 A | 12/2015 |
| CN | 105959165 A | 9/2016 |
| CN | 106134159 A | 11/2016 |
| CN | 106464707 A | 2/2017 |
| CN | 106465049 A | 2/2017 |
| CN | 107196983 A | 9/2017 |
| CN | 107836103 A | 3/2018 |
| CN | 108141463 A | 6/2018 |
| EP | 3005740 A1 | 4/2016 |
| WO | 2015168091 A1 | 11/2015 |
| WO | 2017155251 A1 | 9/2017 |
| WO | 2018059026 A1 | 4/2018 |
| WO | 2020119699 A1 | 6/2020 |

OTHER PUBLICATIONS

The first Office Action of the Priority Application No. 201811508318.5, dated Feb. 18, 2021.
Written Opinion of the International Searching Authority in International Application No. PCT/CN2019/124438, dated Feb. 28, 2020 with English translation provided by Google Translate.
The second Office Action of corresponding Chinese application No. 201811508318.5, dated Oct. 11, 2021.
The EESR of corresponding European application No. 19895771.4, dated Nov. 12, 2021.
The third Office Action of corresponding Chinese application No. 201811508318.5, dated Mar. 3, 2022.
The first Office Action of corresponding Indian application No. 202117030635, dated Mar. 7, 2022.

* cited by examiner

US 11,463,376 B2

RESOURCE DISTRIBUTION METHOD AND APPARATUS IN INTERNET OF THINGS, DEVICE, AND STORAGE MEDIUM

CROSS-REFERENCE TO RELATED APPLICATIONS

This application is a continuation of International Application No. PCT/CN2019/124438, filed on Dec. 11, 2019, which claims priority to Chinese Patent Application No. 201811508318.5 filed with China National Intellectual Property Administration on Dec. 11, 2018 and entitled "RESOURCE DISTRIBUTION METHOD AND APPARATUS IN INTERNET OF THINGS, DEVICE, AND STORAGE MEDIUM". These applications are incorporated herein by reference in their entireties.

TECHNICAL FIELD

Embodiments of the present application relate to an Internet of Things technology and, in particular, to a resource distribution method and apparatus in Internet of Things, a device, and a storage medium.

BACKGROUND

As a technical standards organization in the Internet of Things (IoT) application layer, the Open Connectivity Foundation (OCF) has formulated a service framework for interconnection between devices in the Internet of Things. In this service framework, a device in the Internet of Things and a functional service implemented by the device may be represented over a resource. An entity that provides the resource is a serving device, and an entity that accesses the resource may be a client device. In the Internet of Things, by means of transmitting an operation request to the serving device, the client device may implement a resource operation for the serving device, such as creating, updating, deleting and others, thereby realizing a corresponding business.

However, the client device needs to discover a resource prior to the resource operation for the serving device, while in some scenarios, the client device cannot directly discover the resource of the serving device, for example, when the serving device is in a sleep state. For this reason, the serving device may distribute the resource on a server, so that the client device may transmit a resource discovery request to the server and then perform a resource discovery.

When a failure occurs on the server, the client device cannot discover the resource of the serving device through the server, nor perform the resource operation for the serving device, thereby affecting realization of a business service.

SUMMARY

Embodiments of the present application provide a resource distribution method and apparatus in Internet of Things, a device, and a storage medium to improve resource discovery in reliability.

In a first aspect, an embodiment of the present application may provide a resource distribution method in Internet of Things. The method includes:

discovering, by a serving device, servers with resource directories from a server cluster; and distributing, by the serving device, resource information to at least two servers of the servers with the resource directories.

In a second aspect, an embodiment of the present application may provide a resource distribution method in Internet of Things, including:

receiving, by a first server, resource information transmitted by a serving device; and storing, by the first server, the resource information into a resource directory;

where the first server is one of servers with resource directories discovered by the serving device from a server cluster, and at least two servers of the servers with the resource directories receive the resource information.

In a third aspect, an embodiment of the present application may provide a resource distribution method in Internet of Things, including:

receiving, by a second server, resource information transmitted by a first server; and storing, by the second server, the resource information into a resource directory;

where the first server and the second server both are servers with resource directories from a server cluster.

In a fourth aspect, an embodiment of the present application further provides a resource distribution apparatus in Internet of Things, including:

a processing module and a transceiving module;

where the processing module is configured to control the transceiving module to discover servers with resource directories from a server cluster; and the transceiving module is configured to distribute resource information to at least two servers of the servers with the resource directories.

In a fifth aspect, an embodiment of the present application further provides a resource distribution apparatus in Internet of Things applied to a first server, including:

a transceiving module, configured such that the first server receives resource information transmitted by a serving device; and a processing module, configured to store the resource information into a resource directory;

where the first server is one of servers with resource directories discovered by the serving device from a server cluster, and at least two servers of the servers with the resource directories receive the resource information.

In a sixth aspect, an embodiment of the present application further provides a resource distribution apparatus in Internet of Things applied to a second server, including:

a receiving module, configured to receive resource information transmitted by a first server; and a processing module, configured to store the resource information into a resource directory;

where the first server and the second server both are servers with resource directories from a server cluster.

In a seventh aspect, an embodiment of the present application further provides a serving device, including: a transceiver, a processor, and a memory;

where the memory has computer executable instructions stored therein;

the processor executes the computer executable instructions stored in the memory to enable the serving device to perform the resource distribution method in the Internet of Things according to the first aspect.

In an eighth aspect, an embodiment of the present application further provides a server, including: a transceiver, a processor, and a memory;

where the memory has computer executable instructions stored therein;

the processor executes the computer executable instructions stored in the memory to enable the server to perform the resource distribution method in the Internet of Things according to the second aspect or the third aspect.

In a ninth aspect, an embodiment of the present application further provides a computer readable storage medium having, stored therein, computer executable instructions which, when executed by a processor, implement the resource distribution method in the Internet of Things described above according to the first aspect.

In a tenth aspect, an embodiment of the present application further provides a computer readable storage medium having, stored therein, computer executable instructions which, when executed by a processor, implement the resource distribution method in the Internet of Things described above according to the second aspect or the third aspect.

According to the resource distribution method and apparatus in the Internet of Things, the device, and the storage medium provided in the embodiments of the present application, servers with resource directories may be discovered by a serving device from a server cluster, and resource information may be distributed by the serving device to at least two servers of the servers with the resource directories, in this way, the resource information may be stored on the at least two servers to achieve multi-server distribution of the resource information, so that a resource of the serving device can be discovered by a client device provided that one server having the resource information stored therein can operate normally, thereby effectively improving resource discovery in reliability.

BRIEF DESCRIPTION OF DRAWINGS

In order to describe technical solutions in the embodiments of the present application or the prior art more clearly, accompanying drawings used for description of the embodiments or the prior art will be briefly described hereunder. Obviously, the described drawings are merely some embodiments of present application. For persons of ordinary skill in the art, other drawings may be obtained based on these drawings without any creative effort.

DESCRIPTION OF EMBODIMENTS

In order to describe objectives, technical solutions, and advantages in the embodiments of the present application more clearly, the technical solutions in the embodiments of the present application will be described hereunder clearly and comprehensively with reference to the accompanying drawings in the embodiments of the present application. Obviously, the described embodiments are only some embodiments of the present application, rather than all embodiments of the present application. All other embodiments obtained by persons of ordinary skill in the art based on the embodiments of the present application without any creative effort shall fall into the protection scope of the present application.

Terms such as "first", "second" and the like in the specification and the claims as well as the described accompany drawings of the present application are used to distinguish similar objects, but not intended to describe a specific order or sequence. It will be appreciated that data used in this way may be exchangeable under appropriate circumstances, such that the embodiments of the present application described herein can be implemented in an order other than those illustrated or described herein. Moreover, terms such as "include" and "have" and any variation thereof are intended to cover a non-exclusive inclusion, e.g., processes, methods, systems, products or devices that contain a series of steps or units are not necessarily limited to those steps or units that are clearly listed, but may include other steps or units that are not explicitly listed or inherent to these processes, methods, products or devices.

Figure 1:
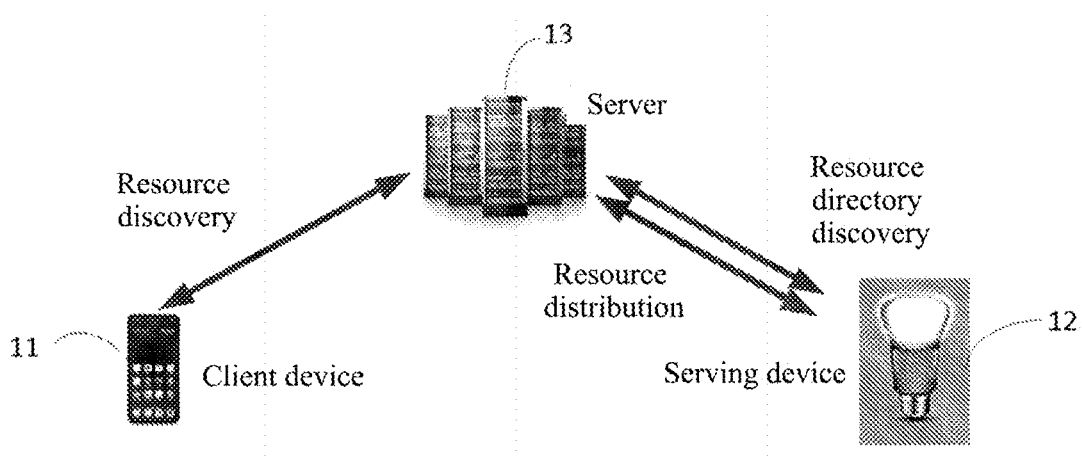
FIG. 1 is a schematic diagram of an Internet of Things system applied in an embodiment of the present application.

Before introduction to the solutions provided in the embodiments of the present application, a network system applied in an embodiment of the present application will be described hereunder firstly. FIG. 1 is a schematic diagram of an Internet of Things system applied in an embodiment of the present application. As shown in FIG. 1, the Internet of Things system includes a client device 11, a serving device 12 and multiple servers 13. It is understandable that in actual applications, there may be one or more client devices 11 and one or more serving devices 12, and only one is used as an example in FIG. 1. The client device 11 and the serving device 12 can be connected to the server 13 respectively. The client device 11 can be connected to the server 13 in a wired or wireless manner, and the serving device 12 can also be connected to the server 13 in a wired or wireless manner.

The client device 11 is an entity that accesses a resource, which may be a terminal device installed with an OCF client-side application. The terminal device is any terminal device such as a desktop computer, a notebook, a Personal Digital Assistant (PDA for short), a smart phone, a tablet, etc. The client device 11 may also be termed as an OCF client-side device, a customer device, or a customer premise device.

The serving device 12 may be an entity that provides a resource, which may be a data collecting device such as a sensor or a data acquisition card, an electrical component device such as a switch, a socket or a lamp, and an electronic device such as an air conditioner, a washing machine, a refrigerator, a sound box, or a television set. Certainly, the foregoing only describes some possible examples of the serving device 12, and the serving device 12 may also be other intelligent hardware device that can provide a resource and implement a corresponding functional service, thus details will not be described again in the embodiment of the present application. The serving device 12 may be termed as an OCF server-side entity, a resource entity, a resource provider, or a resource device.

The server 13 may have resource information of the serving device 12 stored therein. In this way, during resource discovery, the client device 11 may transmit a resource discovery request to the server 13, and receive the resource information of the serving device 12 returned by the server 13, thereby achieving resource discovery for the serving device 12 without transmission of the resource discovery request to the serving device 12 and avoiding a resource discovery failure due to dormancy of the serving device 12 and other reasons. The server 13 may be a server in a local area network or a server in a wide area network. If it is the server in the local area network, the server 13 may be a gateway device or a terminal device with a gateway function. If it is the server in the wide area network, the server 13 may be a data center server, also termed as a cloud server. Regardless of the server in the local area network or the server in the wide area network, the server 13 may be a device installed with the OCF server-side application, or a resource directory server or the like. The resource directory server may be a dedicated server for storing resource information, which may also be termed as a resource server or the like.

There may be multiple servers 13, and some or all of the multiple servers 13 may have resource information of the serving device 12 stored therein. The server 13 which may have the resource information of the serving device 12 stored therein may be a server with a resource directory (RD for short). The server with the resource directory can be configured to store the resource information of the serving device 12. The server with the resource directory can also be termed as a resource server, or a resource directory server.

Therefore, before distributing the resource information of the serving device 12 to the servers 13, the serving device 12 needs to discover resource directories first to determine a server with a resource directory of the multiple servers 13. During resource directory discovery, the serving device may transmit a resource directory discovery request to each server from the server cluster. The resource directory discovery request may include a resource identifier of the server and a query condition. The resource identifier of the server may be a resource identifier for resource directory discovery, which may be a Uniform Resource Identifier (URI for short) of the server, and the URI of the server may be, for example, /oic/res. The query condition may include: a resource type (rt for short), which is a resource directory type, and can be indicated as oic.wk.rd. The resource directory discovery request may be a Get operation command for the resource directory, which can be indicated as Get /oic/res?rt=oic.wk.rd. After receiving the resource directory discovery request, each server may determine whether it meets the query condition according to the identifier of the resource directory and the query condition. If the query condition is met, the server may return a resource directory discovery response to the serving device. If the serving device receives the resource directory discovery response transmitted by the server, the serving device then discovers the server.

Based on the current technology, the serving device 12 may use one of the servers 13 discovered by it as a target server to distribute resource information. In this way, when there is a failure in the server 13, or when the resource information stored on the server 13 is faulty, the client device 11 cannot discover the resource, rendering low reliability of resource discovery.

Therefore, according to the embodiments of the present application, the following multiple resource distribution methods enable the serving device 12 to distribute the resource of the serving device 12 to multiple servers 13 with resource directories regardless of the number of discovered servers with resource directories, so that the multiple servers 13 with the resource directories are stored with the resource information.

If the serving device 12 only discovers one server 13 with a resource directory, the serving device 12 may also transmit the resource information of the serving device 12 to that server, and instruct that server to transmit the resource information of the serving device 12 to a further server with a resource directory. The further server may be a server with a resource directory discovered by that server 13.

If the serving device 12 discovers multiple servers 13 with resource directories, the serving device may transmit the resource information of the serving device 12 to some or all of the servers 13 with the resource directories directly, or may transmit the resource information of the serving device 12 to one of the servers 13 and instruct that server to transmit the resource information of the serving device 12 to a further server with a resource directory. The further server may be a server with a resource directory discovered by the serving device 12, or a server with a resource directory discovered by that server 13.

Before a resource operation for the serving device 12, the client device 11 needs to perform resource discovery first to discover a resource on the serving device 12. During the resource discovery, the client device may transmit a resource discovery request to each server from the server cluster. The resource discovery request may include a resource identifier of the server. The resource identifier of the server may be a URI of the server, and the URI of the server may be, for example, /oic/res. The resource discovery request may be a Get operation command for the resource directory, which can be indicated as Get /oic/res. Certainly, the resource discovery request may also include: a resource query condition. After receiving the resource discovery request, each server may determine, according to the resource identifier of the server and the query condition, whether it has resource information that meets the query condition. If there is resource information that meets the query condition, the server 13 returns, to the client device 11, a resource discovery response which may include: resource information on the serving device 12. If the client device 11 receives the resource discovery response including the resource information of the serving device 12 as transmitted by the server, the client device 11 then discovers the resource on the serving device 12.

Then, when the multiple servers 13 with the resource directories all have the resource information of the serving device 12 stored thereon, the client device 11 may discover resources on the serving device 12 provided that one server 13 having the resource information of the serving device 12 stored therein can operate normally, thereby effectively improving resource discovery in reliability.

The resource distribution method provided in the embodiment of the present application will be explained and illustrated hereunder in combination with multiple examples. It should be noted that the resources involved in the embodiments of the present application are resources in the Internet of Things, which may be termed as OCF resources and intended for representation of a serving device and a functional service of the serving device. The serving device may be a serving device whose usage frequency is less than or equal to a first preset threshold, a serving device whose dormancy frequency is greater than or equal to a second preset threshold, a serving device whose sleeplessness duration is greater than or equal to a preset duration, or a serving device which belongs to a network that is different from the client device. Certainly, other types of serving devices may also perform the following resource distribution method, which is not limited in the embodiments of the present application.

Figure 2:
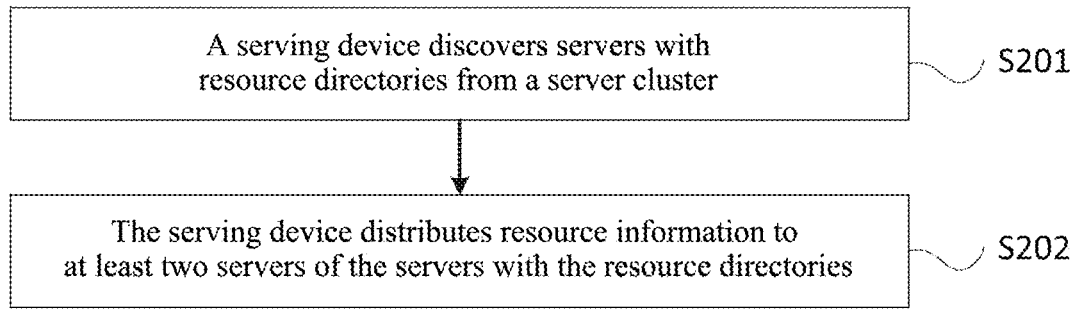
FIG. 2 is a first flowchart of a resource distribution method in Internet of Things according to an embodiment of the present application.

FIG. 2 is a first flowchart of a resource distribution method in Internet of Things according to an embodiment of the present application. The resource distribution method in the Internet of Things shown in FIG. 2 may be implemented by the above-mentioned serving device 12 shown in FIG. 1 through software and/or hardware. As shown in FIG. 2, the resource distribution method in the Internet of Things may include:

S201, a serving device discovers servers with resource directories from a server cluster.

The serving device may perform a resource directory discovery to discover the servers with the resource directories from the server cluster. In the embodiment, the serving device may discover a server with a resource directory, and may also discover some or all servers with resource directories.

S202, the serving device distributes resource information to at least two servers of the servers with the resource directories.

The resource information may include at least one of the following information: a resource identifier of the serving device, a resource type (rt) of the serving device, and a resource access interface (if) of the serving device.

The resource information may be resource representation, and its specific form may be a resource link (Link).

In the resource information, the resource identifier may be a URI of a resource, which may be used to indicate an address of the resource on a serving device side. The client device can access the resource of the serving device through the resource identifier, that is, the URI. In the resource representation, the resource identifier can be indicated by "href", and a specific value of the href is the URI of the resource. In the resource information, the resource type may be used to indicate a type of the resource provided by the serving device, and in the resource representation, the resource type can be indicated by "rt". In the resource information, the resource access interface may be an access interface for an operation such as viewing or regulation of the resource.

The resource information may include: information about some or all resources possessed by the serving device. Information about each resource of the some or all resources may include at least one of the following information: an identifier of each resource, a type of each resource, and an access interface of each resource.

For example, if the serving device is a lamp, the serving device has resources of at least two resource types, such as a switch resource and a brightness resource. The resource information may include information about at least one of the following resources: the switch resource and the brightness resource. Information about each resource may include at least one of the following information: the identifier of each resource, the type of each resource, and the access interface of each resource.

If the serving device is an air conditioner, the serving device has resources of at least four resource types, such as a switch resource, a temperature resource, a cool/heat mode resource, and a fan mode resource. The resource information may include information about at least one of the following resources: the switch resource, the temperature resource, the cool/heat mode resource, and the fan mode resource. Information about each resource may include at least one of the following information: the identifier of each resource, the type of each resource, and the access interface of each resource.

As described above, the resource information is illustrated using only the lamp and the air conditioner as examples of the serving device, and the serving device may also be other devices, which is not limited in the embodiment of the present application.

In an embodiment, the above-described S202 where the serving device distributes the resource information to the at least two servers of the servers with the resource directories may include:

the serving device transmit the resource information to the servers with the resource directories directly; or, the serving device transmit the resource information to a first server of the servers with the resource directories, and instruct the first server to transmit the resource information to a further server of the servers with the resource directories.

That is to say, the serving device may distribute the resource information through multiple distributing approaches. In a specific implementation, the serving device may transmit the resource information to at least two servers with resource directories directly, or may transmit the resource information to a first server with a resource directory and the first server transmits the resource information to a further server with a resource directory. No matter which kind of approach is adopted, as long as the resource information can be distributed on the at least two servers with the resource directories, it will be ok. If the serving device transmits the resource information directly, the serving device may transmit the resource information to the servers with the resource directories simultaneously, or may transmit the resource information to the servers with the resource directories according to a priority order of the servers. If the serving device transmits the resource information through the first server, the serving device transmits the resource information to the first server and the first server transmits the resource information to a further server with a resource directory simultaneously, alternatively, the first server may transmit the resource information to a further server with a resource directory according to a priority order of the servers.

In a first distributing approach, if the serving device discovers some or all servers with resource directories, the serving device may also use the some or all servers with the resource directories as target servers, and transmit the resource information to the some or all servers with the resource directories directly.

In a second distributing approach, if the serving device discovers one or more servers with resource directories, the serving device may use the one or more servers as target server(s), and transmit the resource information to the one or more servers and instruct the one or more servers to transmit the resource information to a further server with a resource directory discovered by the one or more servers.

In a third distributing approach, if the serving device discovers some or all servers with resource directories, the serving device may select one or more servers from the some or all servers with the resource directories as target server(s), and transmit the resource information to the one or more servers and instruct the one or more servers to transmit the resource information to a further server with a resource directory discovered by the first server.

In a fourth distributing approach, if the serving device discovers some or all servers with resource directories, the serving device may also select one or more servers from the some or all servers with the resource directories as target server(s), and transmit the resource information to the one or more servers and instruct the one or more servers to transmit the resource information to a further server with a resource directory discovered by the serving device.

Certainly, the serving device may also use other distributing approaches to distribute the resource information, so as to distribute the resource information to at least two servers with resource directories. For example, the serving device may select, from some or all servers with resource directories discovered by it, two servers as target servers, and transmit the resource information to the two servers and the two servers transmit the resource information to a further server with a resource directory. Certainly, the foregoing only describes possible examples of other implementations, and the embodiments of the present application are not limited thereto.

According to the resource distribution method in the Internet of Things provided in the embodiment of the present application, servers with resource directories may be discovered by a serving device from a server cluster, and resource information may be distributed by the serving device to at least two servers of the servers with the resource directories, in this way, the resource information may be stored on the at least two servers to achieve multi-server distribution of the resource information, so that a resource of the serving device can be discovered by a client device provided that one server having the resource information stored therein can operate normally, thereby effectively improving resource discovery in reliability.

For the first distributing approach mentioned above, an embodiment of the present application may also provide a resource distribution method in Internet of Things. The resource distribution method in the Internet of Things provided in this embodiment may be an implementation example of the above-described resource distribution method in the Internet of Things shown in FIG. 2. In this example, the serving device may directly transmit the resource information to at least two servers with resource directories discovered by the serving device. The resource distribution method in the Internet of Things based on the first distributing approach will be described hereunder in detail in combination with specific examples.

Figure 3:
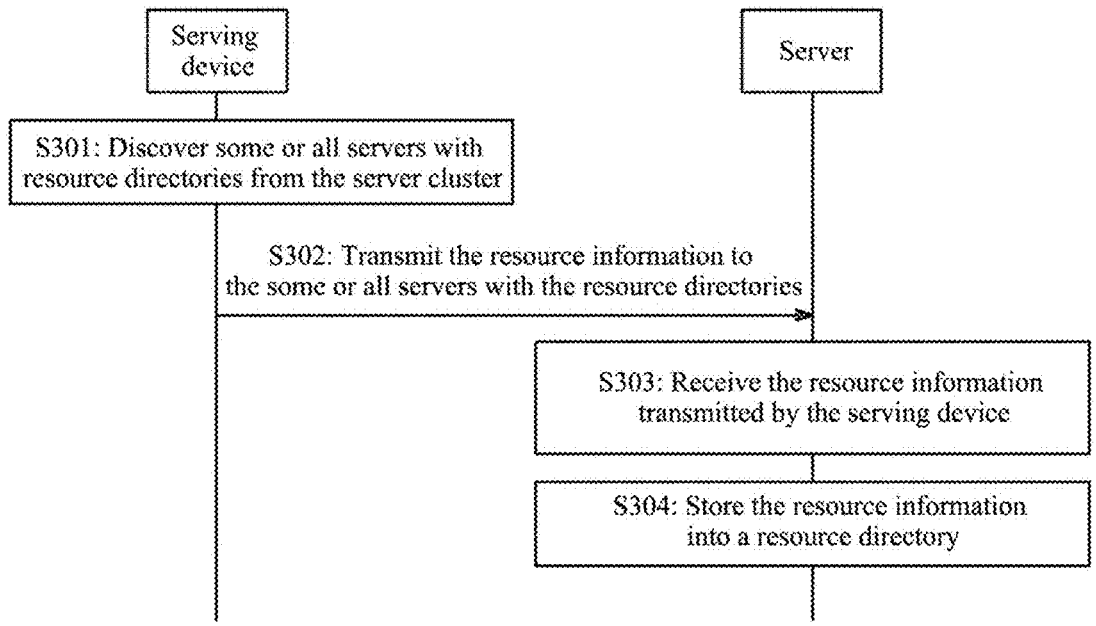
FIG. 3 is a second flowchart of a resource distribution method in Internet of Things according to an embodiment of the present application.

FIG. 3 is a second flowchart of a resource distribution method in Internet of Things according to an embodiment of the present application. As shown in FIG. 3, in an embodiment, S201 where the serving device discovers the servers with the resource directories from the server cluster may include:

S301, the serving device discovers some or all servers with resource directories from the server cluster.

The serving device may transmit a resource directory discovery request to each server from the server cluster, and if a discovery response returned by the server is received, it can be determined that servers with resource directories are discovered.

In this embodiment, the serving device may discover some or all servers with resource directories from the server cluster.

Correspondingly, S202 where the serving device distributes the resource information to the at least two servers of the servers with the resource directories may include:

S302, the serving device transmits the resource information to the some or all servers with the resource directories.

The serving device may select, from all servers with resource directories discovered by it, some servers as target servers, and transmit the resource information to each server of the target servers; alternatively, the serving device may use all servers with resource directories discovered by it as target servers and transmit the resource information to each server of the target servers.

Either for some or all servers with resource directories, the serving device may transmit a resource distributing (POST) request to each server. The resource distributing request may include a URI of the server, such as oic/rd, and the resource distributing request can be indicated as: POST /oic/rd, for example. A message of the resource distributing request contains the resource information, such as a resource link.

In this embodiment, the resource distributing request may be as follows:

```
{
    {"di": "server_device_id",
        "link":[
            {
                "anchor": "ocf://server_device_id",
                "href": "/mysleepysensor",
                "rt": ["oic.r.sensor"],
                "if": ["oic.if.s", "oic.if.baseline"],
                "p": {"bm":3},
                "eps": [{"ep":"coaps://[fe80::1]:1111"}]
            }
        ]
    }
}
```

As can be seen from the above, in this embodiment, the resource distributing request may include: an identifier of the serving device and a resource link. The identifier of the serving device can be indicated by "di", which may be "ocf://server_device_id". The resource link can be indicated by "link", which may include: a context URI, a target URI, a resource type, an access interface, a bitmask of a resource policy, and endpoints.

Among them, the context URI can be indicated by "anchor" and can be used to indicate an URI of an owner resource containing the link, that is, the URI of the serving device, which may be "ocf://server_device_id".

The target URI can be indicated by "href" and can be used to indicate a URI of a target resource on the serving device, which can be "/mysleepysensor".

The resource type can be indicated by "rt" and can be used to indicate a type of a target resource on the serving device, which can be "oic.r.sensor".

The access interface can be indicated by "if" and can be used to indicate a type of an access interface supported by a target resource on the serving device, which can include: "oic.if.s" and "oic.if.baseline".

The bitmask of the resource policy can be indicated by "bm" and has a value of 3, which can be used to indicate that a target resource on the serving device can be discovered and viewed.

The endpoints can be indicated by "eps" and can indicate an URI of endpoints at which a target resource of the serving device can be accessed, which can be "coaps://[fe80::1]:1111".

The resource distributing request may also include: a resource reference, which can be indicated by "ref" and can be used to indicate a relationship between the target URI and the context URI.

When some or all servers with resource directories discovered by the serving device are multiple, the serving device may transmit the resource information to the multiple servers simultaneously, or transmit the resource information to them in a preset order.

In an embodiment, S302 where the serving device transmits the resource information to the some or all servers with the resource directories may include:

the serving device transmits the resource information to some or all servers of the servers with the resource directories according to a priority order of the servers.

For the some or all servers with the resource directories discovered by the serving device, the serving device may also determine a priority order of the some or all servers with the resource directories. The priority order may be, for example, a time order in which the serving device discovers the servers, that is, a time order in which discovery responses returned by the servers are received, or may be a priority order determined according to weights of the resource directories of the servers. The weights of the resource directories are determined according to at least one factor of: server storage capacity, operating system, and power information.

Certainly, there also may be other priority orders. The foregoing is only an example, and the embodiments of the present application are not limited thereto.

In an embodiment, the method may also include:

S303, each server of the some or all servers with the resource directories receives the resource information transmitted by the serving device; and S304, each server stores the resource information into a resource directory.

Each server may store the received resource information into the resource directory in any form such as a table or a database.

When the serving device performs a resource distributing, a message body of its distributing request can carry the resource information, and the server can store the resource information into the resource directory when receiving the distributing request.

In an embodiment, each server may also transmit a resource distributing response to the serving device to indicate that a resource of the serving device has been distributed on each server.

According to the resource distribution method in the Internet of Things provided in the embodiment of the present application, the serving device may transmit the resource information to the some or all servers with the resource directories discovered by it directly, in this way, the resource information is stored on the at least two servers with the resource directories, thereby effectively ensuring resource discovery in reliability.

For the second distributing approach and the third distributing approach mentioned above, an embodiment of the present application may also provide a resource distribution method in Internet of Things. The resource distribution method in the Internet of Things provided in this embodiment may be another implementation example of the above-described resource distribution method in the Internet of Things shown in FIG. 2. In this example, the resource information may be transmitted by the serving device to a server with a resource directory discovered by the serving device, and is forwarded by that server to a further server with a resource directory discovered by that server. The resource distribution method in the Internet of Things based on the second distributing approach or the third distributing approach will be described hereunder in detail in combination with specific examples.

Figure 4:
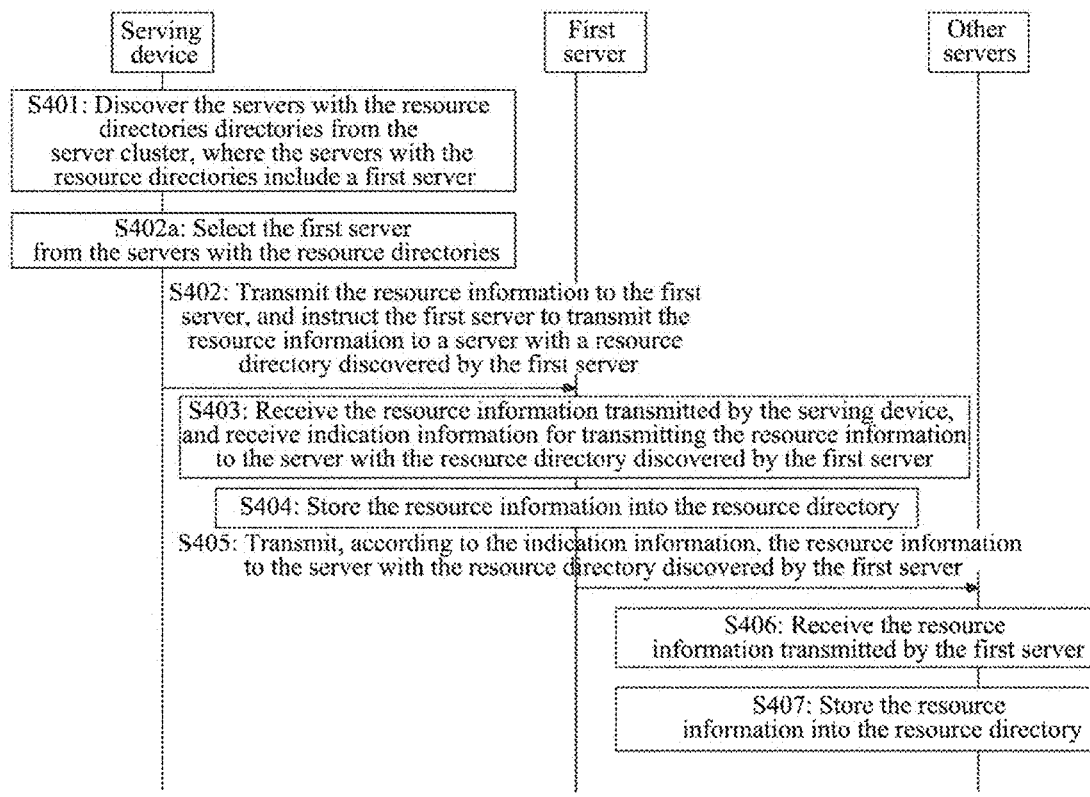
FIG. 4 is a third flowchart of a resource distribution method in Internet of Things according to an embodiment of the present application.

FIG. 4 is a third flowchart of a resource distribution method in Internet of Things according to an embodiment of the present application. As shown in FIG. 4, in an embodiment, S201 where the serving device discovers the servers with the resource directories from the server cluster may include:

S401, the serving device discovers the servers with the resource directories from the server cluster, where the servers with the resource directories include a first server.

In a specific implementation, based on the second distributing approach, the serving device discovers one or more servers with resource directories from the server cluster, and then determines the one or more servers as the first server.

Based on the third distributing approach, the serving device may discover some or all servers with resource directories from the server cluster, and select one or more servers from them as the first server.

Correspondingly, the above-described S202 where the serving device distributes the resource information to the at least two servers of the servers with the resource directories may include:

S402, the serving device transmits the resource information to the first server, and instructs the first server to transmit the resource information to a server with a resource directory discovered by the first server.

In this embodiment, the serving device may instruct, in multiple instruction manners, the first server to transmit the resource information to the server with the resource directory discovered by the first server.

In an instruction manner, the serving device may multiplex existing fields to instruct the first server to transmit the resource information to the server with the resource directory discovered by the first server.

The above-described S402 where the serving device transmits the resource information to the first server, and instructs the first server to transmit the resource information to the server with the resource directory discovered by the first server may include:

the serving device transmits a resource distributing request to the first server, where the resource distributing request contains a resource link.

The resource link contains the resource information and indication information, where the indication information is used to indicate that the first server is allowed to transmit the resource information to the server with the resource directory discovered by the first server.

In this manner, the serving device can carry the indication information by multiplexing fields in the resource link. For example, the indication information is implemented by multiplexing at least part of bits of a bitmask in a resource policy of the resource link. The part of bits may be reserved bits of the bitmask in the resource policy of the resource link.

If the bitmask in the resource policy of the resource link has 8 bits, of which 2 bits have been used, in this embodiment, the indication information may be implemented by at least one of the remaining 6 bits.

Exemplarily, among the bits of the bitmask in the resource policy of the resource link in a descending order, if the seventh and eighth bits are occupied, in this embodiment, the indication information may be implemented by the sixth bit, rendering a possibility that the bitmask in the resource policy of the resource link may have a value of 111. Therefore, if the bitmask in the resource policy of the resource link has the value of 111, it can be used to indicate that the first server is allowed to transmit the resource information to the server with the resource directory discovered by the first server.

In this implementation, the resource distributing request may be as follows:

```
{
    {"di": "server_device_id",
        "link": [
            {
                "anchor": "ocf://server_device_id",
                "href": "/mysleepysensor",
                "rt": ["oic.r.sensor"],
                "if": ["oic.if.s", "oic.if.baseline"],
                "p": {"bm":7},
                "eps": [{"ep":"coaps://[fe80::1]:1111"}]
            }
        ]
    }
}
```

In this manner, the structure of this resource distributing request may be similar to that of the above resource distributing request in the embodiment provided in FIG. 3, reference may be made to the foregoing description for similarities, and details will not be described here again, their difference only lies in that the bitmask in the resource policy of the resource link has different values. In an embodiment of this implementation, the bitmask in the resource policy of the resource link may have a value of 111, which is used to indicate that the first server is allowed to transmit the resource information to the server with the resource directory discovered by the first server.

Certainly, the indication information may also be implemented by other bits. The above only describes an example. If it is implemented by other bits, the bitmask in the resource policy of the resource link may have other assigned values to indicate that the first server is allowed to transmit the resource information to the server with the resource directory discovered by the first server.

In another instruction manner, the serving device may also instruct, through an attribute field, the first server to transmit the resource information to the server with the resource directory discovered by the first server.

The above-described S402 where the serving device transmits the resource information to the first server, and instructs the first server to transmit the resource information to the server with the resource directory discovered by the first server may include:

the serving device transmits a resource distributing request to the first server, where the resource distributing request contains a resource link and indication information.

The resource link contains the resource information, and the indication information is used to indicate that the first server is allowed to transmit the resource information to the server with the resource directory discovered by the first server.

In this manner, the serving device may carry the indication information through an attribute field in the resource distributing request. The attribute field may be a resource distribution or synchronization attribute. The attribute field may be, for example, "rse". When the attribute field has a value of "true", it can be used to indicate that the first server is allowed to transmit the resource information to a further server with a resource directory. Conversely, when the attribute field has a value of "false", it can be used to indicate that the first server is prohibited from transmitting the resource information to a further server with a resource directory.

In this manner, the resource distributing request may be as follows:

```
{
    {"di": "server_device_id",
        "rse": "true",
        "link": [
            {
                "anchor": "ocf://server_device_id",
                "href": "/mysleepysensor",
                "rt": ["oic.r.sensor"],
                "if": ["oic.if.s", "oic.if.baseline"],
                "p": {"bm":3},
                "eps": [{"ep":"coaps://[fe80::1]:1111"}]
            }
        ]
    }
}
```

In this manner, the structure of this resource distributing request may differ from that of the above resource distributing request in the embodiment provided in FIG. 3 in that, in the embodiment of the implementation, the resource distributing request further includes an attribute field "rse"; for their similarities, reference may be made to the foregoing description, and details will not be described here again. The attribute field has a value of true, which can be used to indicate that the first server is allowed to transmit the resource information to the further server with the resource directory.

The foregoing only describes possible examples of the instruction manner, according to the embodiments of the present application, other instruction manners may also be used to instruct the first server to transmit the resource information to the server with the resource directory discovered by the first server, and details will not be described here again.

For the above-mentioned third distributing approach, in an embodiment, if the serving device discovers multiple servers with resource directories, before the above-described S402 where the serving device transmits the resource information to the first server, the method may include:

S402a, the serving device selects the first server from the servers with the resource directories.

The serving device may randomly select, from the servers with the resource directories, a server as the first server, or may select, from the servers with the resource directories, a first discovered server as the first server, or may use a preset weight rule to select, from the servers with the resource directories, a server with the highest weight as the first server.

Exemplarily, the serving device may select, from the servers with the resource directories according to a resource directory weight of each server of the servers with the resource directories, a server with the highest resource directory weight as the first server.

In an embodiment, either for the second distributing approach or the third distributing approach, the method may also include:

S403, the first server receives the resource information transmitted by the serving device, and receives indication information for transmitting the resource information to the server with the resource directory discovered by the first server; and S404, the first server stores the resource information into the resource directory.

The first server may store the received resource information into the resource directory in any form such as a table or a database.

When the serving device performs a resource distributing, a message body of its distributing request can carry the resource information, and the first server can store the resource information into the resource directory when receiving the distributing request.

In an embodiment, the first server may also transmit a resource distributing response to the serving device to indicate that a resource of the serving device has been distributed on the first server.

S405, the first server transmits, according to the indication information, the resource information to the server with the resource directory discovered by the first server.

Upon receiving the resource information, the first server discovers the server with the resource directory from the server cluster according to an indication of the serving device. That is to say, the further server is the server with the resource directory discovered by the first server from the server cluster. In order for distinguishing from the first server, the further server may also be termed as a second server, a third server or in any other expressions, and details will not be described here again.

The implementation process in which the first server discovers the server with the resource directory from the server cluster is similar to the foregoing implementation process in which the serving device discovers the server with the resource directory from the server cluster. For details, reference may be made to the foregoing description, which will not be described here again.

The first server may simultaneously transmit the resource information to a further server of the servers with the resource directories, that is, the server with the resource directory discovered by the first server, or may transmit, according to a priority order of the servers, the resource information to the servers with the resource directory discovered by the first server.

In an embodiment, S405 where the first server transmits, according to the indication information, the resource information to the server with the resource directory discovered by the first server may include:

the first server transmits, according to the indication information, a notification message to the server with the resource directory discovered by the first server, where the notification message includes: the resource information and indication information that prohibits continuous transmission of the resource information.

When transmitting the resource information to the further server, the first server also transmits to the further server indication information that prohibits continuous transmission of the resource information in order that the further server is prohibited from continuous distribution of the resource information, thereby avoiding repeated distribution of the resource information.

The structure of the notification message including the indication information that prohibits the further server from continuous transmission of the resource information may be similar to the structure of the above resource distributing request including the indication information that allows the first server to transmit the resource information to the further server with the resource directory, reference may be made to the foregoing description for the same portion, and details will not be described here again.

In this embodiment, the serving device can carry, through multiple indication manners, the indication information that prohibits the continuous transmission of the resource information.

In an indication manner, the notification message may include a resource link, where the resource link includes the resource information and indication information that prohibits continuous transmission of the resource information.

In this manner, the indication information that prohibits the continuous transmission of the resource information may be implemented by at least part of bits of a bitmask in a resource policy of the resource link. The part of bits may be idle bits of the bitmask in the resource policy of the resource link. If the bitmask in the resource policy of the resource link has 8 bits, of which 2 bits have been used, in this embodiment, the indication information may be implemented by at least one of the remaining 6 bits.

Exemplarily, among the bits of the bitmask in the resource policy of the resource link in a descending order, if the seventh and eighth bits are occupied, in this embodiment, if the bitmask in the resource policy of the resource link has a value of 011, it can be used to indicate that the first server is prohibited from transmitting the resource information to the further server with the resource directory.

The rest of the structure of the notification message may be similar to the structure of the resource distributing request in the foregoing embodiment, reference may be made to the foregoing description, and details will not be described here again.

In another indication manner, the notification message may include a resource link and indication information that prohibits continuous transmission of the resource information, and the resource link includes the resource information.

In this implementation, the serving device may carry, through an attribute field added in the resource distributing request, the indication information that prohibits continuous transmission of the resource information. The attribute field may be a resource distribution or synchronization attribute. The attribute field may be, for example, "false", which may be used to indicate that the first server is prohibited from transmitting the resource information to the further server with the resource directory.

The foregoing only describes possible examples of the indication manner, according to the embodiments of the present application, the indication information that prohibits the continuous transmission of the resource information may also be carried through other indication manners, and details will not be described here again.

S406, a further server other than the first server receives the resource information transmitted by the first server.

In an embodiment, the above-described S406 where the further server receives the resource information transmitted by the first server may include:

the further server may also receive a notification message transmitted by the first server, where the notification message contains the resource information and indication information that prohibits continuous transmission of the resource information.

S407, the further server stores the resource information into the resource directory.

The further server may store the received resource information into the resource directory in any form such as a table or a database.

In an embodiment, the further server may also transmit a resource distributing response to the serving device to indicate that a resource of the serving device has been distributed on the further server.

According to the resource distribution method in the Internet of Things provided in the embodiment of the present application, the resource information may be transmitted to a first server with a resource directory, and indicates that the first server is allowed to transmit the resource information to a server with a resource directory discovered by the first server, thereby achieving multi-server distribution of the resource information and ensuring resource discovery in reliability. At the same time, when transmitting the resource information to a further server, the first server may also indicate a prohibition for the further server from continuous transmission of the resource information, thereby avoiding repeated distribution of the resource information and avoiding information redundancy.

For the fourth distributing approach mentioned above, an embodiment of the present application may also provide a resource distribution method in Internet of Things. The resource distribution method in the Internet of Things provided in this embodiment may be another implementation example of the above-described resource distribution method in the Internet of Things shown in FIG. 2. In this example, the resource information may be transmitted by the serving device to a server with a resource directory discovered by the serving device, and is forwarded by that server to a further server with a resource directory discovered by the serving device. The resource distribution method in the Internet of Things based on the fourth distributing approach will be described hereunder in detail in combination with specific examples.

Figure 5:
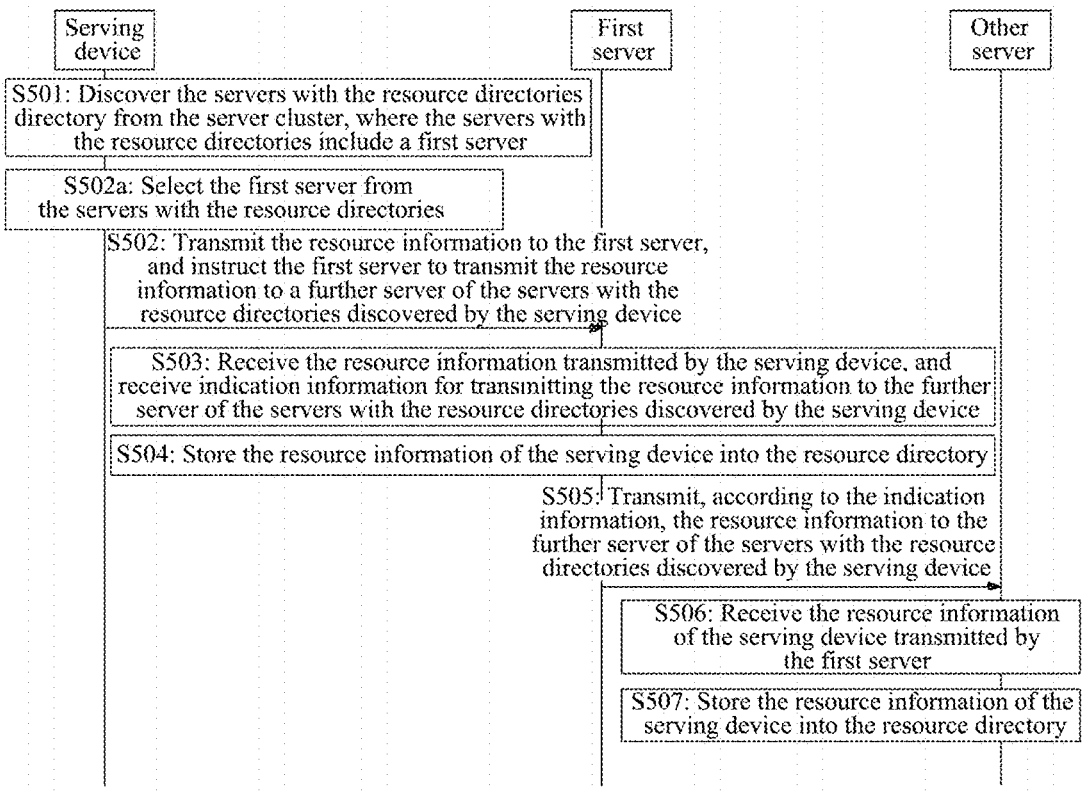
FIG. 5 is a fourth flowchart of a resource distribution method in Internet of Things according to an embodiment of the present application.

FIG. 5 is a fourth flowchart of a resource distribution method in Internet of Things according to an embodiment of the present application. As shown in FIG. 5, in an embodiment, S201 where the serving device discovers the servers with the resource directories from the server cluster may include:

S501, the serving device discovers the servers with the resource directories from the server cluster, where the servers with the resource directories include a first server.

The specific implementation of S501 may be similar to that of S401. For details, reference may be made to the foregoing description, which will not be described here again.

Correspondingly, S202 where the serving device distributes the resource information to the at least two servers of the servers with the resource directories may include:

S502, the serving device transmits the resource information to the first server, and instructs the first server to transmit the resource information to a further server of the servers with the resource directories discovered by the serving device.

In this embodiment, the serving device may instruct, through an identifier of the server, the first server to transmit the resource information to a further server of the servers with the resource directories discovered by the serving device, or may instruct, through indication information, that the first server is allowed to transmit the resource information to a further server with a resource directory discovered by the serving device.

In an embodiment, the above-described S502 where the serving device transmits the resource information to the first server, and instructs the first server to transmit the resource information to the further server of the servers with the resource directories discovered by the serving device includes:

the serving device transmits a resource distributing request to the first server, where the resource distributing request contains a resource link and at least one server identifier.

The resource link contains the resource information; and the at least one server identifier is used to enable the first server to transmit the resource information to a server corresponding to the at least one server identifier. The at least one server is the further server, other than the first server, of the servers with the resource directories discovered by the serving device.

In an implementation, the resource link further contains indication information which is used to indicate that the first server is allowed to transmit the resource information to the server corresponding to the at least one server identifier.

The serving device can carry the indication information by multiplexing fields in the resource link. For example, the indication information is implemented by multiplexing at least part of bits of a bitmask in a resource policy of the resource link. The part of bits may be idle bits of the bitmask in the resource policy of the resource link.

In this implementation, the structure of the resource distributing request may be similar to that of the resource distributing request in the above method of FIG. 4 where the indication information is implemented by at least part of bits of the bitmask in the resource policy of the resource link, their difference only lies in that, in this implementation, the resource distributing request further includes at least one server identifier; for their similarities, reference may be made to the foregoing description, and details will not be described here again.

In another implementation, the resource distributing request further includes indication information; where the indication information is used to indicate that the first server is allowed to transmit the resource information to the server corresponding to the at least one server identifier.

The serving device may carry the indication information through an attribute field in the resource distributing request. The attribute field may be a resource distribution or synchronization attribute.

In this implementation, the structure of the resource distributing request may be similar to that of the resource distributing request in the above method of FIG. 4 where the indication information is implemented by an attribute field added in the resource distributing request, their difference only lies in that, in this implementation, the resource distributing request further includes at least one server identifier; for their similarities, reference may be made to the foregoing description, and details will not be described here again.

In an embodiment, regardless of either one of the cases where the above indication information is implemented by at least part of bits of the bitmask of the resource policy in the resource link or where the above indication information is implemented by the added attribute field, in the resource distributing request, the identifier of the at least one server may be arranged according to the server priority so that the first server transmits the resource information to the server corresponding to the at least one server identifier according to the priority order.

In the resource distributing request, the identifier of the at least one server may be in a form of list.

In an embodiment, before the above-described S502 where the serving device transmits the resource information to the first server, what is further included is:

S502$a$, the serving device selects the first server from the servers with the resource directories.

The specific implementation of S502a may be similar to that of S402a described above. Reference may be made to the foregoing description, and details will not be described here again.

In an embodiment, the above-described S502a where the serving device selects the first server from the servers with the resource directories may include:

the serving device selects, from the servers with the resource directories according to a resource directory weight of each server of the servers with the resource directories, a server with the highest resource directory weight as the first server.

The implementation in this embodiment where the serving device selects the first server according to resource directory weights of the servers may be similar to the implementation in the above-described embodiment corresponding to FIG. 4, and details will not be described here again.

In an embodiment, the method may also include:

S503, the first server receives the resource information transmitted by the serving device, and receives indication information for transmitting the resource information to the further server of the servers with the resource directories discovered by the serving device; and S504, the first server stores the resource information into the resource directory.

The specific implementation of S504 may be similar to that of the above-described S404, reference may be made to the forgoing description, and details will not be described here again.

In an embodiment, the first server may also transmit a resource distributing response to the serving device to indicate that a resource of the serving device has been distributed on the first server.

S505, the first server transmits, according to the indication information, the resource information to the further server of the servers with the resource directories discovered by the serving device.

The first server may simultaneously transmit the resource information to the further server of the servers with the resource directories discovered by the serving device, or may transmit, according to a priority order of the servers, the resource information to a servers with a resource directory discovered by the serving device.

The further server is the server with the resource directory discovered by the serving device from the server cluster. In order for distinguishing from the first server, the further server may also be termed as a second server, a third server or in any other expressions, and details will not be described here again.

S506, the further server receives the resource information transmitted by the first server.

S507, the further server stores the resource information into the resource directory.

The further server may store the received resource information into the resource directory in any form such as a table or a database.

In an embodiment, the further server may also transmit a resource distributing response to the serving device to indicate that a resource of the serving device has been distributed on the further server.

According to the resource distribution method in the Internet of Things provided in the embodiment of the present application, the resource information may be transmitted to a first server with a resource directory, and it indicates that the first server is allowed to transmit the resource information to a further server with a resource directory discovered by the serving device, thereby achieving multi-server distribution of the resource information and ensuring resource discovery in reliability.

Figure 6:
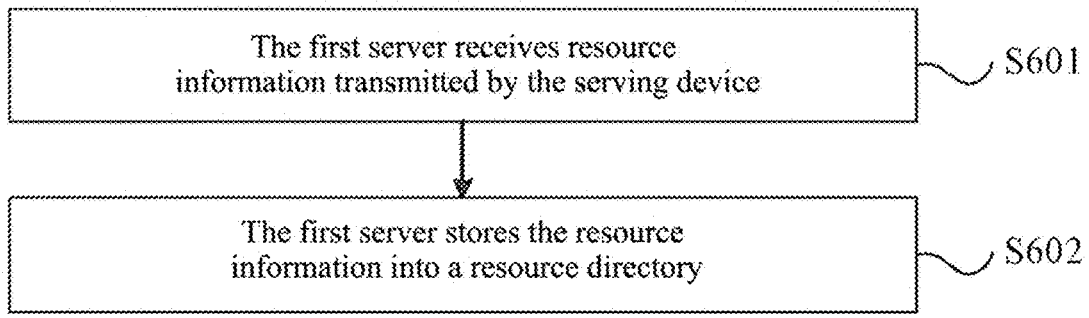
FIG. 6 is a fifth flowchart of a resource distribution method in Internet of Things according to an embodiment of the present application.

An embodiment of the present application may further provide a resource distribution method in Internet of Things. FIG. 6 is a fifth flowchart of a resource distribution method in Internet of Things according to an embodiment of the present application. The resource distribution method in the Internet of Things may be implemented by the servers 13 shown in FIG. 1 through software and/or hardware, among them, the first server may be a server with a resource directory discovered by the serving device. As shown in FIG. 6, the resource distribution method in the Internet of Things may include:

S601, the first server receives resource information transmitted by the serving device; and S602, the first server stores the resource information into the resource directory;

where the first server is one of servers with resource directories discovered by the serving device from a server cluster, and at least two servers of the servers with the resource directories receive the resource information.

The resource distribution method in the Internet of Things shown in FIG. 6 can be executed alone, or may be executed in combination with any of the above-mentioned methods in FIG. 2 to FIG. 5.

If implemented in combination, the serving device involved in this method may also have other functions of the serving device in any one of the methods in FIG. 2 to FIG. 5. For specific functional implementations and feature descriptions, reference may be made to the foregoing description, and details will not be described here again.

The first server involved in this method may also have other functions of the first server in any one of the methods shown in FIG. 2 to FIG. 5. For specific function implementation and feature description, reference may be made to the forgoing description, and details will not be described here again.

According to the resource distribution method in the Internet of Things provided in this embodiment, the resource information may be stored on at least two servers including the first server to achieve multi-server distribution of the resource information, so that a resource of the serving device can be discovered by a client device provided that one server having the resource information stored therein can operate normally, thereby effectively improving resource discovery in reliability.

Figure 7:
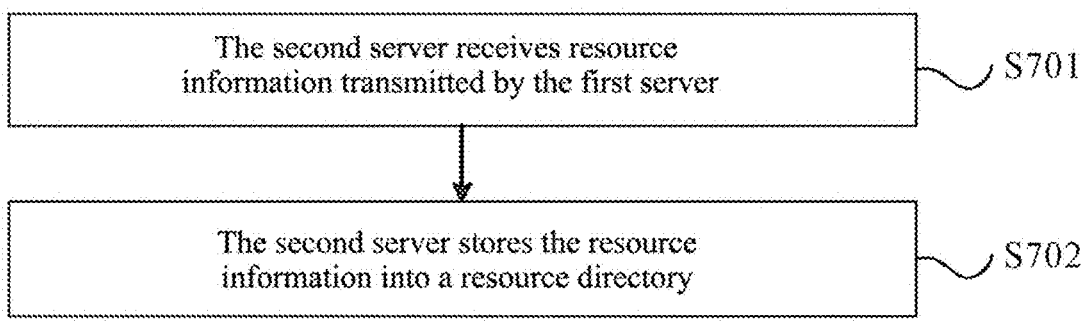
FIG. 7 is a sixth flowchart of a resource distribution method in Internet of Things according to an embodiment of the present application.

An embodiment of the present application may further provide a resource distribution method in Internet of Things. FIG. 7 is a sixth flowchart of a resource distribution method in Internet of Things according to an embodiment of the present application. The resource distribution method in the Internet of Things may be implemented by the servers 13 shown in FIG. 1 through software and/or hardware, among them, the involved second server may be a further server, other than the first server, of servers with resource directories discovered by the serving device, or may be a server with a resource directory discovered by the first server. As shown in FIG. 7, the resource distribution method in the Internet of Things may include:

S701, the second server receives resource information transmitted by the first server; and S702, the second server stores the resource information into a resource directory;

where the first server and the second server both are servers with resource directories from a server cluster.

The resource distribution method in the Internet of Things shown in FIG. 7 can be executed alone, or may be executed in combination with any of the above-mentioned methods in FIG. 2 to FIG. 5.

If implemented in combination, the first server involved in this method may also have other functions of the first server in any one of the methods shown in FIG. 2 to FIG. 5. For specific function implementation and feature description, reference may be made to the forgoing description, and details will not be described here again.

The second server involved in this method may also have other functions of the further server in any one of the methods shown in FIG. 2 to FIG. 5. For specific function implementation and feature description, reference may be made to the forgoing description, and details will not be described here again.

According to the resource distribution method in the Internet of Things provided in this embodiment, the resource information may be stored on at least two servers including the first server and the second server to achieve multi-server distribution of the resource information, so that a resource of the serving device can be discovered by a client device provided that one server having the resource information stored therein can operate normally, thereby effectively improving resource discovery in reliability.

The resource distribution methods in the Internet of Things according to the embodiments of the present application have been described in detail hereinbefore. A resource distribution apparatus in Internet of Things, a device, and a storage medium according to the embodiments of the present application will be described hereinafter.

Figure 8:
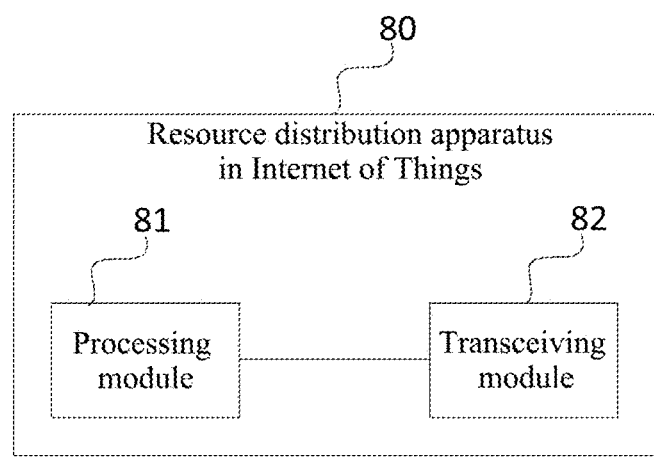
FIG. 8 is a first schematic structural diagram of a resource distribution apparatus in Internet of Things according to an embodiment of the present application.

FIG. 8 is a first schematic structural diagram of a resource distribution apparatus in Internet of Things according to an embodiment of the present application. This embodiment provides a resource distribution apparatus in Internet of Things, which is applied to the serving device 12 shown in FIG. 1 above. The resource distribution apparatus in the Internet of Things may have a product form such as a chip, a circuit or a device. As shown in FIG. 8, the resource distribution apparatus 80 in the Internet of Things in this embodiment includes: a processing module 81 and a transceiver module 82.

The processing module 81 is configured to control the transceiving module 82 to discover servers with resource directories from a server cluster.

The transceiving module 82 is configured to distribute resource information to at least two servers of the servers with the resource directories.

In an embodiment, the processing module 81 is specifically configured to control the transceiving module 82 to discover some or all servers with resource directories from the server cluster.

Correspondingly, the transceiving module 82 is specifically configured to transmit the resource information to the some or all servers with the resource directories.

In an embodiment, the transceiving module 82 is specifically configured to transmit the resource information to the servers with the resource directories directly.

In an embodiment, the transceiving module 82 is specifically configured to transmit the resource information to the servers with the resource directories according to a priority order of the servers.

In an embodiment, the servers with the resource directories include a first server.

The transceiving module 82 is specifically configured to transmit the resource information to the first server, and instruct the first server to transmit the resource information to a further server of the servers with the resource directories.

In an embodiment, the transceiving module 82 is specifically configured to transmit a resource distributing request to the first server, where the resource distributing request contains a resource link and at least one server identifier;

where the resource link contains the resource information; the at least one server identifier is used to enable the first server to transmit the resource information to a server corresponding to the at least one server identifier.

In an embodiment, the resource link further contains indication information which is used to indicate that the first server is allowed to transmit the resource information to the server corresponding to the at least one server identifier.

In an embodiment, the resource distributing request further contains indication information;

where the indication information is used to indicate that the first server is allowed to transmit the resource information to the server corresponding to the at least one server identifier.

In an embodiment, the transceiving module 82 is specifically configured to transmit the resource information to the first server, and instruct the first server to transmit, according to a priority order of the servers, the resource information to the further server of the servers with the resource directories.

In an embodiment, the servers with the resource directories include a first server;

the transceiving module 82 is specifically configured to transmit the resource information to the first server, and instruct the first server to transmit the resource information to a server with a resource directory discovered by the first server.

In an embodiment, the transceiving module 82 is specifically configured to transmit a resource distributing request to the first server, where the resource distributing request contains a resource link.

The resource link contains the resource information and indication information which is used to indicate that the first server is allowed to transmit the resource information to the server with the resource directory discovered by the first server.

In an embodiment, the transceiving module 82 is specifically configured to transmit a resource distributing request to the first server, where the resource distributing request contains a resource link and indication information;

where the resource link contains the resource information, and the indication information is used to indicate that the first server is allowed to transmit the resource information to the server with the resource directory discovered by the first server.

In an embodiment, the indication information is located in at least part of bits of a bitmask in a resource policy of the resource link.

In an embodiment, the indication information is located in an attribute field in the resource distributing request.

In an embodiment, the resource information includes at least one of the following information:

a resource identifier of the serving device, a resource type of the serving device, and a resource access interface of the serving device.

It will be appreciated that the resource distribution apparatus 80 in the Internet of Things has other functions of the serving device in any of the above methods in FIG. 2 to FIG. 5, and for the other functions and beneficial effects, reference may be made to the foregoing description, and details will not be described here again.

Figure 9:
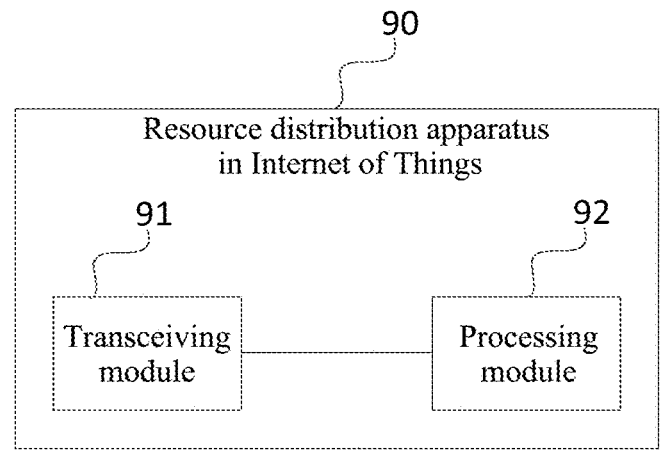
FIG. 9 is a second schematic structural diagram of a resource distribution apparatus in Internet of Things according to an embodiment of the present application.

FIG. 9 is a second schematic structural diagram of a resource distribution apparatus in Internet of Things according to an embodiment of the present application. This embodiment provides a resource distribution apparatus in Internet of Things, which is applied to the servers 13 shown in FIG. 1 above. The resource distribution apparatus in the Internet of Things may have a product form such as a chip, a circuit or a device. As shown in FIG. 9, the resource distribution apparatus 90 in the Internet of Things in this embodiment may be applied to a first server, and includes:

a transceiving module 91, configured to receive resource information transmitted by a serving device; and a processing module 92, configured to store the resource information into a resource directory;

where the first server is one of servers with resource directories discovered by the serving device from a server cluster, and at least two servers of the servers with the resource directories receive the resource information.

In an embodiment, the transceiving module 91 is specifically configured to receive the resource information transmitted by the serving device, and receive indication information for transmitting the resource information to a further server of the servers with the resource directories.

Correspondingly, the transceiving module 91 is configured to transmit, according to the indication information, the resource information to the further server of the servers with the resource directories discovered by the serving device.

In an embodiment, the transceiving module 91 is specifically configured to receive a resource distributing request transmitted by the serving device, where the resource distributing request contains a resource link, and the resource link contains the resource information and the indication information.

In an embodiment, the transceiving module 91 is specifically configured to receive a resource distributing request transmitted by the serving device, where the resource distributing request contains a resource link and the indication information, where the resource link contains the resource information.

In an embodiment, the processing module 92 is configured to control the transceiving module 91 to discover a further server with a resource directory from the server cluster according to the indication information; and the transceiving module 91 is specifically configured to transmit the resource information to the further server with the resource directory.

In an embodiment, the transceiving module 91 is specifically configured to receive a resource distributing request transmitted by the serving device, where the resource distributing request contains a resource link and at least one server identifier, and the resource link contains the resource information.

Correspondingly, the transceiving module 91 is specifically configured to transmit the resource information to a server corresponding to the at least one server identifier.

In an embodiment, the transceiving module 91 is specifically configured to transmit the resource information to the server corresponding to the at least one server identifier according to a priority order of the servers.

In an embodiment, the resource link further includes indication information which is used to indicate that the first server is allowed to transmit the resource information to the server corresponding to the at least one server identifier.

In an embodiment, the resource distributing request further includes indication information which is used to indicate that the first server is allowed to transmit the resource information to the server corresponding to the at least one server identifier.

In an embodiment, the at least one server identifier is arranged according to priority.

In an embodiment, the indication information is located in at least part of bits of a bitmask in a resource policy of the resource link.

In an embodiment, the indication information is located in an attribute field in the resource distributing request.

In an embodiment, the transceiving module 91 is specifically configured to transmit a notification message to the further server of the servers with the resource directories according to the indication information, where the notification message contains the resource information and indication information that prohibits continuous transmission of the resource information.

It will be appreciated that the resource distribution apparatus 90 in the Internet of Things has other functions of the first server in any of the above methods in FIG. 2 to FIG. 5, and for the other functions and beneficial effects, reference may be made to the foregoing description, and details will not be described here again.

Figure 10:
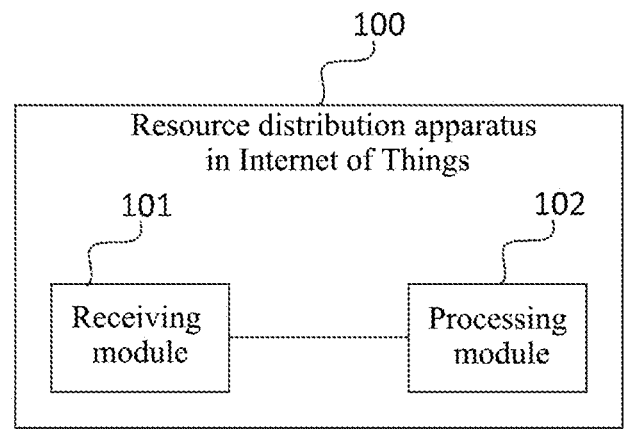
FIG. 10 is a third schematic structural diagram of a resource distribution apparatus in Internet of Things according to an embodiment of the present application.

FIG. 10 is a third schematic structural diagram of a resource distribution apparatus in Internet of Things according to an embodiment of the present application. This embodiment provides a resource distribution apparatus in Internet of Things, which is applied to the servers 13 shown in FIG. 1 above. The resource distribution apparatus in the Internet of Things may have a product form such as a chip, a circuit or a device. As shown in FIG. 10, the resource distribution apparatus 100 in the Internet of Things in this embodiment may be applied to a second server, where the second server may be a further server, other than the first server, of servers with resource directories discovered by the serving device, or may be a further server of servers with resource directories discovered by the first server. The resource distribution apparatus 100 may include:

a receiving module 101, configured to receive resource information transmitted by a first server; and a processing module 102, configured to store the resource information into a resource directory;

where the first server and the second server both are servers with resource directories from a server cluster.

In an embodiment, the receiving module 101 is specifically configured to receive a notification message transmitted by the first server, where the notification message contains the resource information and indication information that prohibits continuous transmission of the resource information.

It will be appreciated that the resource distribution apparatus 100 in the Internet of Things has other functions of the further server or the second server in any of the above methods in FIG. 2 to FIG. 5, and for the other functions and beneficial effects, reference may be made to the foregoing description, and details will not be described here again.

Figure 11:
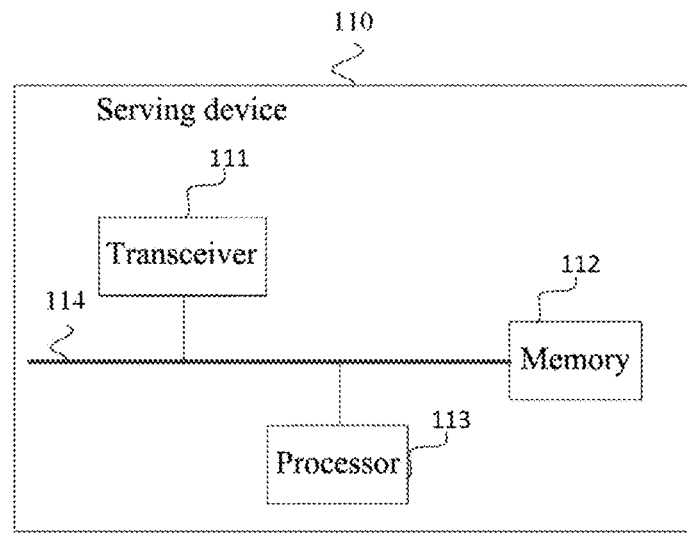
FIG. 11 is a schematic structural diagram of a serving device according to an embodiment of the present application.

An embodiment of the present application may also provide a serving device. FIG. 11 is a schematic structural diagram of a serving device according to an embodiment of the present application. As shown in FIG. 11, the serving device 110 may include: a transceiver 111, a memory 112, and a processor 113. The transceiver 111 may include: a transmitter and a receiver. The transmitter can also be termed as a source, a sender, a transmitting port, a transmitting interface or in any other similar description; and the receiver can also be termed as a sink, a receptor, a receiving port, a receiving interface or in any other similar description.

Exemplarily, the transceiver 111, the memory 112, and the processor 113 are connected to each other through a bus 114.

The memory 112 is configured to store program instructions.

The processor 113 is configured to execute the program instructions stored in the memory to enable the serving device 110 to perform any one of the above-mentioned resource distribution methods in the Internet of Things.

The transmitter in the transceiver 111 may be configured to implement a transmitting function of the serving device for the resource distributing in the Internet of Things.

The receiver of the transceiver 111 may be configured to implement a receiving function of the serving device for the resource distributing in the Internet of Things.

An embodiment of the present application may also provide a computer readable storage medium having stored thereon a computer program which, when executed by a processor, implements any one of the above-mentioned resource distribution methods performed by the serving device.

An embodiment of the present application may also provide a computer program product, which can be executed by a processor, for example, by the processor 113 of the serving device 110. When the computer program product is executed, it can implement any one of the above-mentioned resource distribution methods performed by the serving device.

The serving device, the computer readable storage medium, and the computer program product according to the embodiments of the present application can execute any one of the above-mentioned resource distribution methods performed by the serving device. For specific implementation processes and beneficial effects, reference may be made to the foregoing description, and details will not be described here again.

Figure 12:
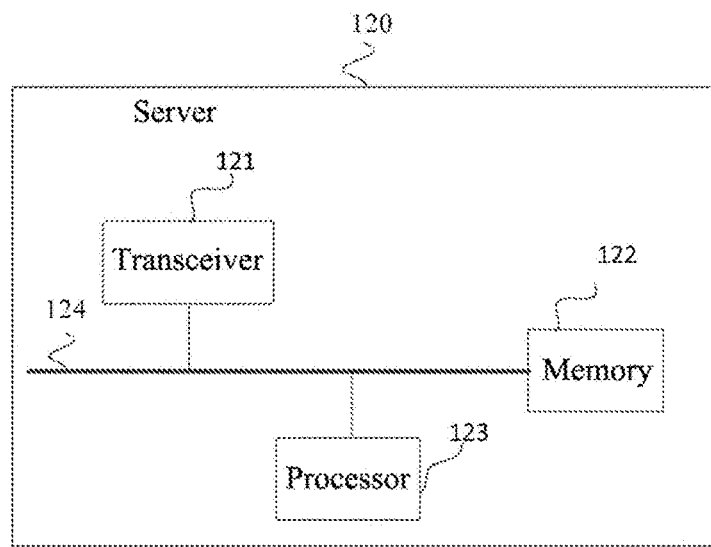
FIG. 12 is a schematic structural diagram of a server according to an embodiment of the present application.

An embodiment of the present application may also provide a server. FIG. 12 is a schematic structural diagram of a server according to an embodiment of the present application. As shown in FIG. 12, the server 120 may include: a transceiver 121, a memory 122, and a processor 123. The transceiver 121 may include: a transmitter and a receiver. The transmitter can also be termed as a source, a sender, a transmitting port, a transmitting interface or in any other similar description; and the receiver can also be termed as a sink, a receptor, a receiving port, a receiving interface or in any other similar description. Exemplarily, the transceiver 121, the memory 122, and the processor 123 are connected to each other through a bus 124.

The memory 122 is configured to store program instructions.

The processor 123 is configured to execute the program instructions stored in the memory to enable the server to perform any one of the above-mentioned resource distribution methods in the Internet of Things.

The transmitter in the transceiver 121 may be configured to implement a transmitting function of the server for the resource distributing in the Internet of Things.

The receiver of the transceiver 121 may be configured to implement a receiving function of the server for the resource distributing in the Internet of Things.

An embodiment of the present application may also provide a computer readable storage medium having stored thereon a computer program which, when executed by a processor, implements any one of the above-mentioned resource distribution methods performed by the server.

An embodiment of the present application may also provide a computer program product, which can be executed by a processor, for example, by the processor 123 of the server 120. When the computer program product is executed, it can implement any one of the above-mentioned resource distribution methods performed by the server.

The serving device, the computer readable storage medium, and the computer program product according to the embodiments of the present application can execute any one of the above-mentioned resource distribution methods performed by the first server, the second server or the further server. For specific implementation processes and beneficial effects, reference may be made to the foregoing description, and details will not be described here again.

In the embodiments provided by the present application, it will be appreciated that the disclosed system, apparatus and method may be implemented in other ways. For example, the aforementioned apparatus embodiments are just exemplary. For example, the division of the units is just a logical function division, and other division mode may be employed in practical implementation. For example, multiple units or components may be combined or integrated to another system, or some features may be omitted, or they are not executed. Another point is that the displayed or discussed mutual coupling, direct coupling or communication connection may be the indirect coupling or communication connection through some interfaces, apparatuses or units, and may be in the form of electrical, mechanical, etc.

The units described as separate components may be or may not be physically separated. The parts displayed as units may be or may not be physical units, and may be located at the same place or deployed on multiple network units. Some or all of the units may be selected upon actual demand to implement the objectives of the solutions of the embodiments.

In addition, various functional units in the respective embodiments of the present application may be integrated into one processing unit, or existed as individual physical units, or two or more units may be integrated into one unit. The integrated unit may be implemented in the form of hardware or software functional unit.

Persons of ordinary skill in the art may understand that, all or a part of the steps of the foregoing method embodiments may be implemented by a program instruction relevant hardware. The foregoing computer program may be stored in a computer readable storage medium. The computer program implements the steps of the foregoing method embodiments when executed by the processor. The foregoing storage medium includes various mediums capable of storing program codes, such as a read only memory (ROM), a random access memory (RAM), a magnetic disk, or an optical disc.

Finally, it should be noted that the foregoing embodiments are merely intended for describing the technical solutions of the present application rather than limiting the present application. Although the present application has been described in detail with reference to the foregoing embodiments, persons of ordinary skill in the art should understand that they may still make modifications to the technical solutions described in the foregoing embodiments, or make equivalent replacements to some technical features therein; however, these modifications or replacements do not make the essence of corresponding technical solutions depart from the scope of the technical solutions in the embodiments of the present application.

What is claimed is:

1. A resource distribution method in Internet of Things, comprising:

discovering, by a serving device, servers with resource directories from a server cluster; and distributing, by the serving device, resource information to at least two servers of the servers with the resource directories according to a priority order of the servers, wherein the priority order of the servers is a priority order that is determined according to weights of the resource directories of the servers;

wherein the distributing, by the serving device, the resource information to at least two servers of the servers with the resource directories according to the priority order of the servers comprises:

transmitting, by the serving device, the resource information to the servers with the resource directories directly according to the priority order of the servers, and the resource directories are configured to store the resource information, which causes a client device to discover resources of the serving device.

2. The method according to claim 1, wherein the discovering, by the serving device, the servers with the resource directories from the server cluster comprises:

discovering, by the serving device, some or all servers with resource directories from the server cluster;

correspondingly, the transmitting, by the serving device, the resource information to the servers with the resource directories directly according to the priority order of the servers comprises:

transmitting, by the serving device, the resource information to the some or all servers with the resource directories directly according to the priority order of the servers.

3. A resource distribution apparatus in Internet of Things, comprising: a processor and a transceiver;

wherein the processor is configured to control the transceiver to discover servers with resource directories from a server cluster; and the transceiver is configured to distribute resource information to at least two servers of the servers with the resource directories according to a priority order of the servers, wherein the priority order of the servers is a priority order that is determined according to weights of the resource directories of the servers;

wherein the transceiver is specifically configured to transmit the resource information to the servers with the resource directories directly according to the priority order of the servers, and the resource directories are configured to store the resource information, which causes a client device to discover resources of the serving device.

4. A non-transitory computer readable storage medium having, stored therein, computer executable instructions which, when executed by a processor, implement the resource distribution method in the Internet of Things according to claim 1.

5. A resource distribution method in Internet of Things, comprising:

discovering, by a serving device, servers with resource directories from a server cluster; and distributing, by the serving device, resource information to at least two servers of the servers with the resource directories according to a priority order of the servers, wherein the priority order of the servers is a priority order that is determined according to weights of the resource directories of the servers;

wherein the distributing, by the serving device, the resource information to at least two servers of the servers with the resource directories according to the priority order of the servers comprises:

transmitting, by the serving device, the resource information to the servers with the resource directories directly according to the priority order of the servers, and the resource directories are configured to store the resource information, which causes a client device to discover resources of the serving device;

wherein the weights of the resource directories of the servers are determined according to at least one factor of: server storage capacity, operating system, and power information.

6. The apparatus according to claim 3, wherein the processor is specifically configured to control the transceiver to discover some or all servers with resource directories from the server cluster;

the transceiver is specifically configured to transmit the resource information to the some or all servers with the resource directories directly according to the priority order of the servers.

7. The non-transitory computer readable storage medium according to claim 4, wherein when the computer executable instructions are executed by the processor, the resource distribution method in the Internet of Things is further implemented by steps of: discovering, by the serving device, some or all servers with resource directories from the server cluster; and transmitting, by the serving device, the resource information to the some or all servers with the resource directories directly according to the priority order of the servers.

8. The method according to claim 5, wherein the discovering, by the serving device, the servers with the resource directories from the server cluster comprises:

discovering, by the serving device, some or all servers with resource directories from the server cluster;

correspondingly, the transmitting, by the serving device, the resource information to the servers with the resource directories directly according to the priority order of the servers comprises:

transmitting, by the serving device, the resource information to the some or all servers with the resource directories directly according to the priority order of the servers.

* * * * *